(12) United States Patent
Kawai

(10) Patent No.: US 7,126,447 B2
(45) Date of Patent: Oct. 24, 2006

(54) RF-MEMS SWITCH

(75) Inventor: Hiroshi Kawai, Yokohama (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 222 days.

(21) Appl. No.: 10/705,994

(22) Filed: Nov. 13, 2003

(65) Prior Publication Data

US 2004/0113727 A1    Jun. 17, 2004

(30) Foreign Application Priority Data

Dec. 12, 2002  (JP) .............................. 2002-361113
Oct. 6, 2003    (JP) .............................. 2003-347181

(51) Int. Cl.
*H01H 51/22*    (2006.01)

(52) U.S. Cl. ........................................ 335/78; 200/181
(58) Field of Classification Search .................. 335/78; 200/181
See application file for complete search history.

(56) References Cited

U.S. PATENT DOCUMENTS

| 6,143,997 | A | 11/2000 | Feng et al. |
| 6,307,452 | B1* | 10/2001 | Sun ............................ 333/262 |
| 6,376,787 | B1 | 4/2002 | Martin et al. |
| 6,621,387 | B1* | 9/2003 | Hopcroft .................... 333/262 |
| 6,639,488 | B1* | 10/2003 | Deligianni et al. ......... 333/101 |
| 6,686,820 | B1* | 2/2004 | Ma et al. .................... 333/262 |
| 6,833,985 | B1* | 12/2004 | Fujii et al. .................. 361/281 |
| 2002/0145493 | A1 | 10/2002 | Wang |

FOREIGN PATENT DOCUMENTS

| JP | 10-335901 | 12/1998 |
| JP | 2001-266727 | 9/2001 |
| JP | 2003-258502 | 9/2003 |
| JP | 2003-264122 | 9/2003 |

OTHER PUBLICATIONS

Chienliu Chang et al.; "Innovative Micromachined Microwaved Switch with Very Low Insertion Loss"; Sensors and Actuators 79 (2000); pp. 71-75.
First Office Action issued in the corresponding Chinese Application No. 200310122590.7 dated Aug. 19, 2005.
Jeremy B. Muldavin et al.; "High-Isolation CPW MEMS Shunt Switches—Part 1: Modeling"; IEEE Transactions on Microwave Theory and Techniques; vol. 48, No. 6, Jun. 2000, pp. 1045-1052.

\* cited by examiner

*Primary Examiner*—Elvin G. Enad
*Assistant Examiner*—Bernard Rojas
(74) *Attorney, Agent, or Firm*—Keating & Bennett, LLP

(57) ABSTRACT

An RF-MEMS switch includes a plurality of movable electrodes disposed with a space provided therebetween in the direction of RF signal conduction of an RF signal-conducting unit which is provided above the RF signal-conducting unit. A movable electrode displacing unit for displacing all the movable electrodes at the same time in the same direction towards or away from the RF signal-conducting unit is provided. The electrical length of the RF signal-conducting unit sandwiched between the movable electrodes is set such that the amplitude of a combined signal including signals reflected in positions of the RF signal-conducting unit facing the movable electrodes is less than the amplitude of each of reflected signals reflected in positions of the RE signal-conducting unit facing the movable electrodes when the movable electrodes are displaced away from the RF signal-conducting unit and signal conduction of the RF signal-conducting unit is switched on.

15 Claims, 14 Drawing Sheets (A - A' CROSS SECTION)

(A - A' CROSS SECTION)

RF-MEMS SWITCH

BACKGROUND OF THE INVENTION

1. Field of the Invention

The present invention relates to RF microelectromechanical systems (RF-MEMS) switches assembled in RF circuit modules for surveillance radar scanners or other devices.

2. Description of the Related Art

As an example of switching devices for RF signals, such as millimeter-wave and microwave signals, a shunt RF-MEMS switch (shunt switching device) is disclosed, for example, in Non-patent Document 1, entitled "High-Isolation CPW MEMS Shunt Switches-Part1: Modeling," (IEEE Transactions on Microwave Theory Techniques, Vol. 48. No. 6, June 2000, pp. 1045–1052) written by J. B. Muldavin, Student Member, IEEE et al.

This type of RF-MEMS switch includes an RF signal-conducting unit provided on a substrate thereof. Also, an electrode facing at least a portion of the RF signal-conducting unit is disposed above the substrate. In such an RF-MEMS switch, displacing the electrode towards or away from the substrate using electrostatic attraction changes the capacitance between the electrode and the RF signal-conducting unit.

For example, reducing the space between a signal line arranged on the RF signal-conducting unit and the movable electrode increases the capacitance between the signal line and the movable electrode, thus switching off conduction of an RF signal of the signal line. In contrast, increasing the space between the signal line and the movable electrode decreases the capacitance between the signal line and the movable electrode, thus switching on the conduction of the RF signal of the signal line. In other words, in this RF-MEMS switch, varying the capacitance between the movable electrode and the signal line by displacing the movable electrode switches RF signal conduction of the RF signal-conducting unit on or off.

However, since known RF-MEMS switches include one switching device which is provided with only one movable electrode, there is a possibility that insertion loss and return loss of the switch cannot be sufficiently reduced and isolation characteristics of the switch cannot be sufficiently improved.

SUMMARY OF THE INVENTION

To overcome the problems described above, preferred embodiments of the present invention provide an RF-MEMS switch which sufficiently reduces insertion loss and return loss of the switch and which sufficiently improves isolation characteristics of the switch.

An RF-MEMS switch according to a preferred embodiment of the present invention includes a substrate, an RF signal-conducting unit arranged on the substrate, a plurality of movable electrodes with a space provided therebetween in the direction of signal conduction of the RF signal-conducting unit and arranged above the RF signal-conducting unit, and a movable electrode displacing unit for displacing the plurality of movable electrodes at the same time in the same direction towards or away from the RF signal-conducting unit. When all of the movable electrodes are displaced in the direction away from the RF signal-conducting unit by the movable electrode displacing unit so as to be disposed at a location where the signal is switched on, conduction of the RF signal of the RF signal-conducting unit is switched on. When all the movable electrodes are displaced in the direction towards the RF signal-conducting unit by the movable electrode displacing unit so as to be disposed in a location where the signal is switched off, conduction of the RF signal of the RF signal-conducting unit is switched off. The electrical length for the RF signal-conducting unit sandwiched between the movable electrodes is determined such that the amplitude of a combined signal including RF signals reflected at locations of the RF signal-conducting unit facing the movable electrodes is less than the amplitude of each of the signals reflected at locations of the RF signal-conducting unit facing the movable electrodes when the movable electrodes are disposed at locations where the signal is switched on.

An RF-MEMS switch according to another preferred embodiment of the present invention includes a substrate, an RF signal-conducting unit arranged on the substrate, a movable element disposed above the substrate with a space provided therebetween and facing at least a portion of the RF signal-conducting unit, a plurality of movable electrodes arranged on the movable element and facing the RF signal-conducting unit, and a movable element displacing unit for displacing the movable element in the direction towards or away from the substrate using electrostatic attraction. The plurality of movable electrodes is arranged with a space provided therebetween in the direction of signal conduction of the RF signal-conducting unit. The RF signal-conducting unit located between the plurality of movable electrodes defines a transmission line having a length that is less than or equal to approximately a quarter of the wavelength of the conducting RF signal of the RF signal-conducting unit because the RF signal-conducting unit located between the plurality of movable electrodes provides a characteristic impedance that is greater than the system impedance.

An RF-MEMS switch according to another preferred embodiment of the present invention includes a substrate, an RF signal-conducting unit arranged on the substrate, a plurality of movable elements disposed with a space provided therebetween in the direction of signal conduction of the RF signal-conducting unit, arranged above the substrate with a space provided therebetween, and facing at least a portion of the RF signal-conducting unit, movable electrodes arranged on the corresponding movable elements and facing the RF signal-conducting unit, and a movable element displacing unit for displacing the movable elements towards or away from the substrate using electrostatic attraction. The RF signal-conducting unit located between the plurality of movable electrodes defines a transmission line having a length that is less than or equal to approximately a quarter of the wavelength of the conducting RF signal of the RF signal-conducting unit because the RF signal-conducting unit located between the plurality of movable electrodes provides a characteristic impedance that is greater than the system impedance.

According to preferred embodiments of the present invention, since the plurality of movable electrodes is disposed with a space therebetween in the direction of signal conduction of the RF signal-conducting unit, the following effects are achieved. When all of the movable electrodes are disposed at locations where the signal is switched on, RF signals reflected in positions of the RF signal-conducting unit facing the movable electrodes are combined. For example, two reflected signals to be combined together which have opposite phases cancel each other out when combined. Thus, the amplitude of the combined signal which includes the reflected signals is zero. Accordingly, the electrical length for the RF signal-conducting unit sandwiched between the movable electrodes (electrical length of the RF signal-conducting unit located between the movable electrodes) is determined such that the amplitude of a combined signal including RF signals reflected in positions of the RF signal-conducting unit facing the movable electrodes is less than the amplitude of each of signals reflected in positions of the RF signal-conducting unit facing the movable electrodes. Thus, the amplitude (energy) of a reflected signal for an RF signal when conduction of the RF signal of the RF signal-conducting unit is switched on is reduced. Therefore, the return loss is reduced and the characteristics of the RF-MEMS switch are improved.

According to preferred embodiments of the present invention, a movable element that is displaced in a direction towards or away from the RF signal-conducting unit on the substrate using electrostatic attraction is constructed such that a plurality of movable electrodes provided on the movable element is disposed with a space provided therebetween in the direction of RF signal conduction. The RF signal-conducting unit located between the plurality of movable electrodes defines a transmission line having a length that is less than or equal to approximately a quarter of the wavelength of the conducting RF signal of the RF signal-conducting unit such the RF signal-conducting unit located between the plurality of movable electrodes provides a characteristic impedance that is greater than the system impedance. Thus, the insertion loss and return loss of the switch is reduced, and the isolation characteristics are improved.

Furthermore, an RF-MEMS switch provided with one movable element including a plurality of movable electrodes consumes much less power to operate. Also, the cost of the RF-MEMS switch of this type is only slightly higher than an RF-MEMS switch provided with one movable element that is provided with one movable electrode. Thus the characteristics of the switch are greatly improved.

Furthermore, a switch may be provided with a plurality of movable elements, each of which is provided with a movable electrode. In this case, the precision of display control for the movable elements is easily improved. Thus, the characteristics of the switch are further improved.

Moreover, since a movable element including a high-resistivity semiconductor may function as an electrode for a low-frequency signal and a DC signal, the movable element itself may function as an electrode of a movable element displacing unit. Thus, it is not necessary to provide an electrode on the movable element for the movable element displacing unit, thereby simplifying the structure and the manufacturing process of the RF-MEMS switch. Also, the movable element including a high-resistivity semiconductor has very low dielectric loss for an RF signal, which reduces the signal loss.

Furthermore, an insulating film is preferably provided on at least one of the surfaces of the RF signal-conducting unit and the movable electrodes. In this case, the RF signal-conducting unit and the movable electrodes are protected. Also, since the RF signal-conducting unit and the movable electrodes do not contact each other, prevention of signal loss caused by contact resistance due to contact of the RF signal-conducting unit and the movable electrodes can be ensured.

Furthermore, the RF signal-conducting unit may be either a coplanar line or a microstrip line, and the RF-MEMS switch may be a shunt switching device. In this case, a shunt switching device for switching conduction of an RF signal on or off in the coplanar line or the microstrip line is performed with very low insertion loss, low return loss, and high isolation.

Furthermore, an RF-MEMS switch may switch the conduction of the signal of the RF signal-conducting unit on or off by separation or direct contact of at least a portion of the movable electrodes and the RF signal-conducting unit that face each other. In this case, since an LC resonance is not used, a switch which exhibits broadband isolation characteristics irrespective of the frequency of the RF signal is achieved.

Furthermore, the movable electrodes for providing the capacitance between the RF signal-conducting unit and the movable electrodes and the movable element displacing unit can be independently designed. Thus, the flexibility in electrode design is increased.

The above and other elements, characteristics, features, and advantages of the present invention will become clear from the following description of preferred embodiments taken in conjunction with the accompanying drawings.

DETAILED DESCRIPTION OF PREFERRED EMBODIMENTS

Preferred embodiments of the present invention will now be described with reference to the drawings.

Figure 1A:
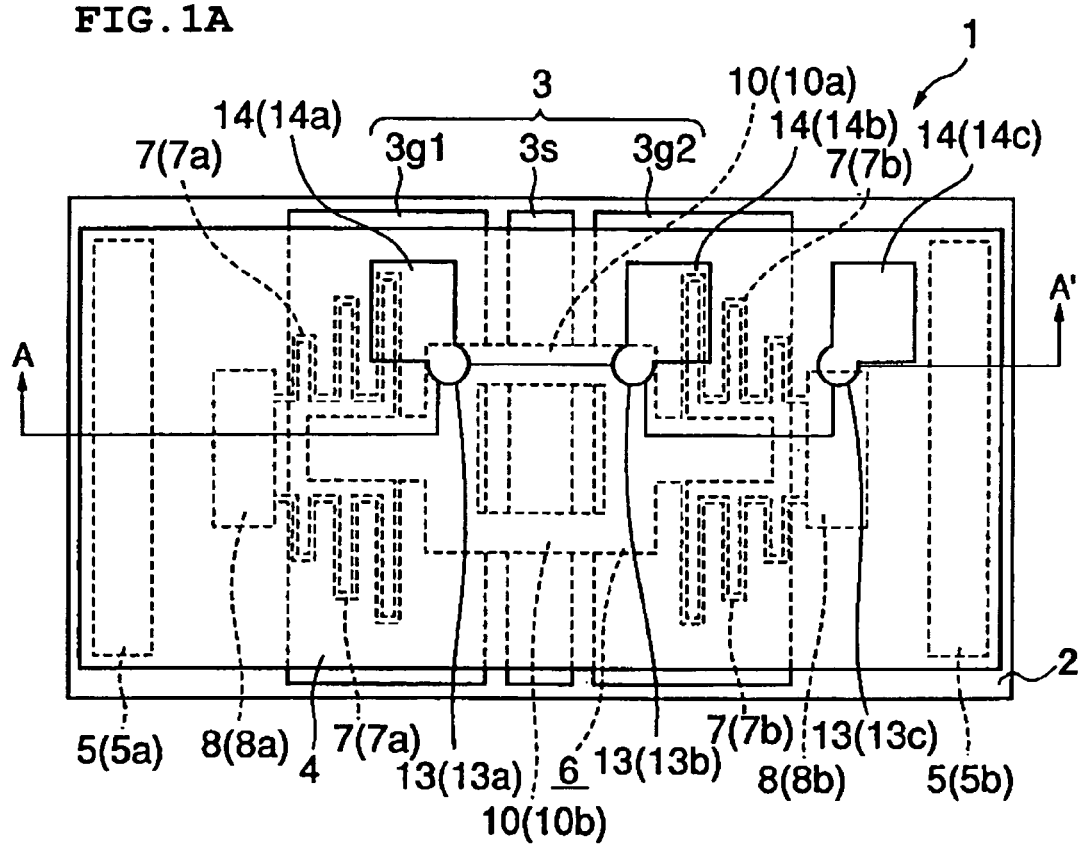
FIGS. 1A and 1B show an RF-MEMS switch according to a first preferred embodiment of the present invention.
Figure 1B:
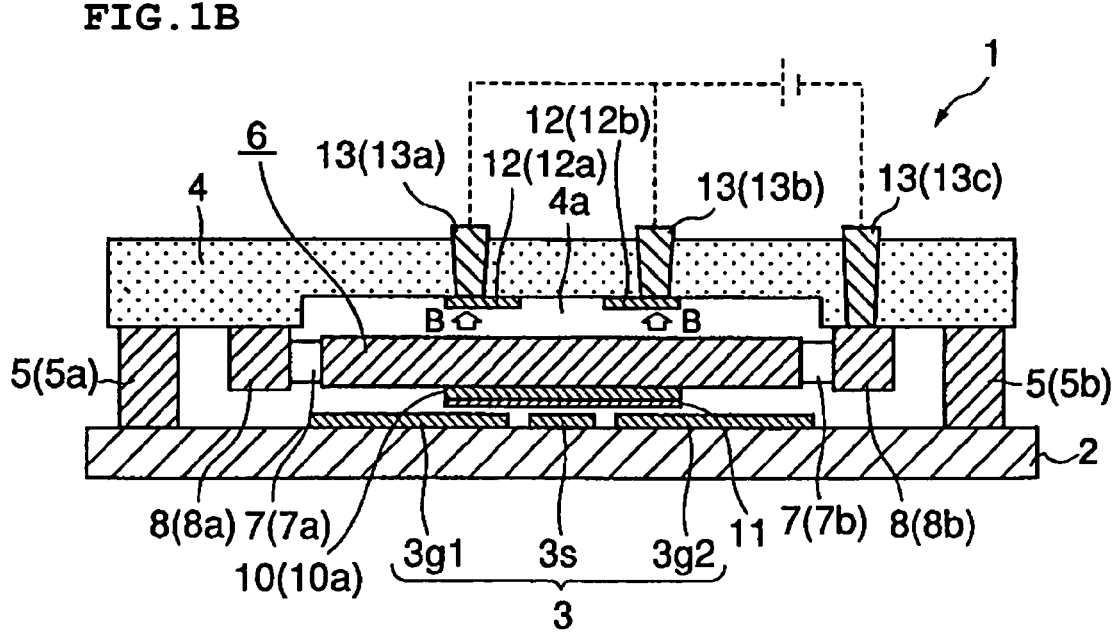

FIG. 1A is a schematic plan view showing an RF-MEMS switch 1 according to a first preferred embodiment of the present invention. FIG. 1B is a schematic cross-sectional view taken along the line A–A' in FIG. 1A.

The RF-MEMS switch 1 according to the first preferred embodiment is assembled in an RF circuit and defines a switching device for a coplanar line. The RF-MEMS switch 1 preferably includes a substrate 2 (for example, a silicon substrate or a sapphire substrate), and a coplanar line (coplanar waveguide (CPW) line) 3, which defines an RF signal-conducting unit, is arranged on the substrate 2. The coplanar line 3 is a line for transmitting an RF signal and includes a signal line 3s and two ground lines 3g1 and 3g2. The signal line 3s is arranged between the ground lines 3g1 and 3g2 but is not in contact with them. The signal line 3s and the ground lines 3g1 and 3g2 are preferably made of, for example, conducting films made of gold (Au) or other suitable materials. The thickness of the signal line 3s and the ground lines 3g1 and 3g2 is set to a desired thickness. For example, the thickness is preferably approximately 2 μm. In the first preferred embodiment, for example, an RF signal of at least about 5 GHz flows in the coplanar line 3.

An upper member (for example, a glass substrate) 4 is arranged above the substrate 2, with a space therebetween. The upper member 4 is fixed above the substrate 2 with fixing units 5 (5a and 5b) therebetween. A movable element 6 is arranged in the space between the substrate 2 and the upper member 4. The movable element 6 is separated from the top of the coplanar line 3 and faces portions of the signal line 3s and the ground lines 3g1 and 3g2 of the coplanar line 3. The movable element 6 is supported by the upper member 4 with beams 7 (7a and 7b) and holders 8 (8a and 8b) disposed therebetween such that the movable element 6 can be displaced towards or away from the substrate 2.

Figure 2A:
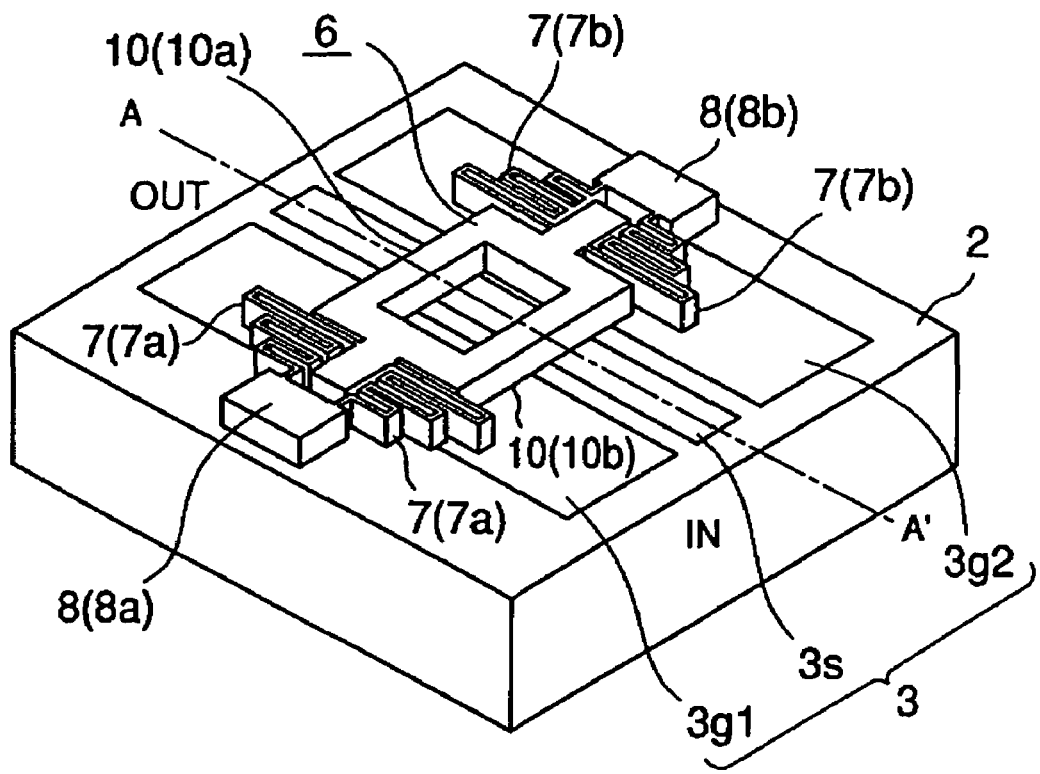
FIGS. 2A and 2B are explanatory diagrams of the configuration of a movable element of the RF-MEMS switch according to the first preferred embodiment of the present invention.
Figure 2B:
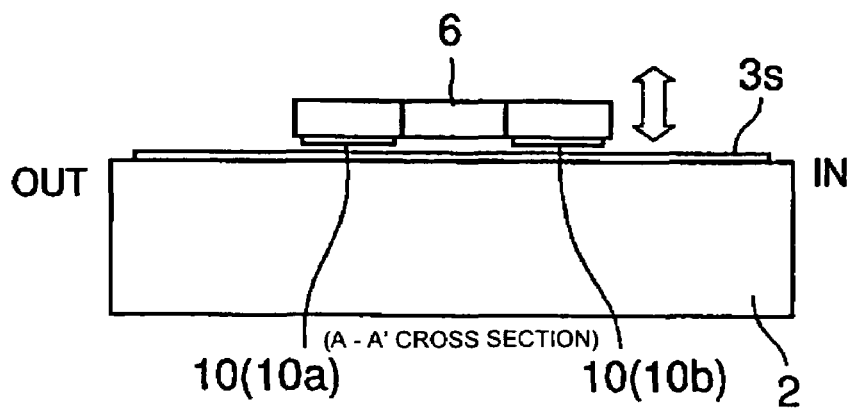

The movable element 6 is preferably a frame, and two movable electrodes 10 (10a and 10b) which are defined by, for example, conducting films made of gold (Au) or other suitable material are arranged on the surface on the substrate 2 side of the movable element 6. The movable electrodes 10a and 10b are disposed with a space therebetween in the direction of signal conduction of the coplanar line 3 (longitudinal direction of the signal line 3s). FIG. 2A is a schematic perspective view of the configuration of the movable element 6 arranged above the substrate 2, together with the beams 7 (7a and 7b) and the holders 8 (8a and 8b). FIG. 2B is a cross-sectional view taken along the line A–A' in FIG. 2A.

Figure 3A:
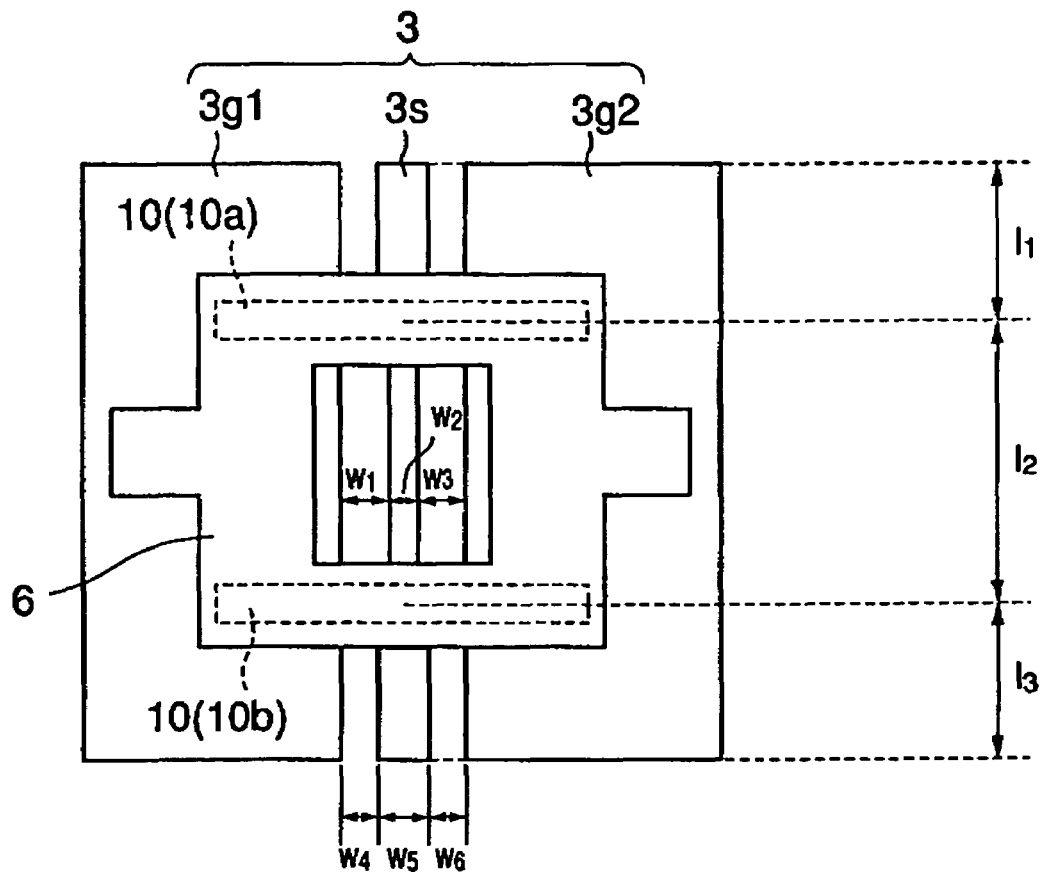
FIGS. 3A and 3B are model diagrams schematically showing an example of the positional relationship of movable electrodes and a coplanar line defining the RF-MEMS switch according to the first preferred embodiment of the present invention.
Figure 3B:
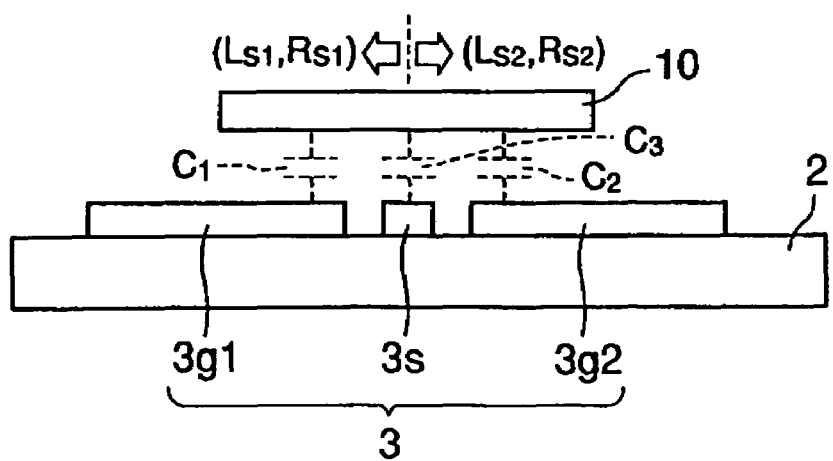

FIG. 3A is a simplified illustration showing the positional relationship of the movable element 6, the movable electrodes 10 (10a and 10b), and the coplanar line 3 when viewed from the upper member 4. FIG. 3B is an illustration showing the positional relationship of the movable electrodes 10 and the coplanar line 3 when viewed from the side. As shown in FIGS. 3A and 3B, the movable electrodes 10a and 10b are arranged so as to cross the ground line 3g1, the signal line 3s, and the ground line 3g2 of the coplanar line 3 and to face the signal line 3s and the ground lines 3g1 and 3g2 with a space therebetween.

Although the widths of the signal line 3s and the ground lines 3g1 and 3g2 and the spaces between them are not particularly limited, for example, as shown in FIG. 3A, the width W1 of the space (gap) between the signal line 3s and the ground line 3g1 and the width W3 of the space (gap) between the signal line 3s and the ground line 3g2 in an area that is sandwiched between the movable electrodes 10a and 10b are represented by W1=W3=about 41 μm, and the width W2 of the signal line 3s in the area sandwiched between the movable electrodes 10a and 10b is represented by W2=about 30 μm. In contrast, the width W4 of the space between the signal line 3s and the ground line 3g1 and the width W6 of the space between the signal line 3s and the ground line 3g2 in an area that is not sandwiched between the movable electrodes 10a and 10b are represented by W4=W6=about 31 μm, and the width W5 of the signal line 3s in the area not sandwiched between the movable electrodes 10a and 10b is represented by W5=about 50 μm. Accordingly, in the first preferred embodiment, the width of the signal line 3s in the area sandwiched between the movable electrodes 10a and 10b is less than the width of the signal line 3s in the area not sandwiched between the movable electrodes 10a and 10b. Also, the overall length of the signal line 3s in the RF-MEMS switch 1 is preferably about 2 mm.

As shown in FIG. 1B, in the first preferred embodiment, protective insulating films 11 are arranged on the surface of the movable electrodes 10 (10a and 10b). For example, the insulating films 11 are preferably made of insulating materials such as silicon nitride (SiN) or other suitable materials. The insulating films 11 are very thin films and have a thickness of, for example, approximately 0.1 μm.

The upper member 4 includes a recess 4a in a portion which faces the movable element 6, and fixed electrodes 12 (12a and 12b) which face the movable element 6 are provided on the internal surface of the recess 4a. Through holes 13a, 13b, and 13c are arranged in the surface of the upper member 4. The through holes 13a and 13b extend from the surface of the upper member 4 to the fixed electrodes 12a and 12b, respectively. The through hole 13c extends from the surface of the upper member 4 to the holder 8b. Electrode pads 14a, 14b, and 14c are arranged on the surface of the upper member 4 and are connected to the through holes 13a, 13b, and 13c, respectively.

In the first preferred embodiment, the movable element 6 is preferably made of a high-resistivity semiconductor. The high-resistivity semiconductor functions as an insulator for an RF signal (for example, a signal of approximately 5 GHz or more) and functions as an electrode for a low-frequency signal (for example, a signal of approximately 100 kHz or less) and a DC signal. In the first preferred embodiment, the high-resistivity semiconductor defining the movable element 6 has a resistivity ranging from about 1,000 Ω cm to about 10,000 Ω cm. In the first preferred embodiment, the beams 7 and the holders 8 are preferably made of the same materials.

High-resistivity silicon, which is an example of the high-resistivity semiconductor, has the following dielectric loss (tan δ) characteristics. As shown by the solid line B in FIG.

Figure 8:
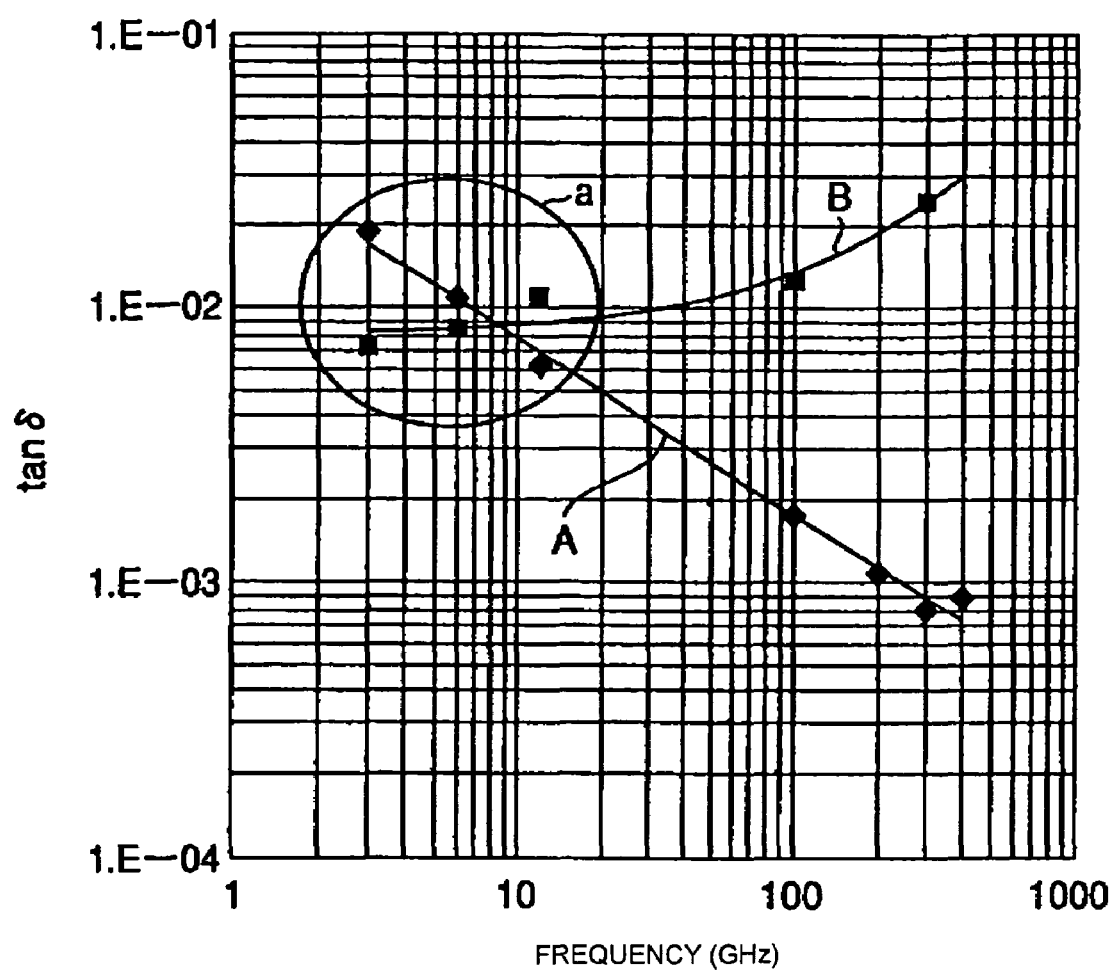
FIG. 8 is a graph showing an example of the relationship between the frequency and dielectric loss (tan δ) of a high-resistivity semiconductor by comparing it with the relationship between the frequency and dielectric loss of glass.

8, in higher frequencies, the dielectric loss of an insulator made of glass increases as the frequency increases. In contrast, although the high-resistivity silicon functions as an insulator at higher frequencies, the dielectric loss of the high-resistivity silicon decreases as the frequency increases, as shown by the solid line A in FIG. 8. In FIG. 8, the solid line A represents values for a high-resistivity silicon having a resistivity of about 2,000 Ω cm. Values in an area encircled by the solid line a are experimental values and the others are reference values. Values represented by the solid line B are reference values for Pyrex (registered trademark) glass.

In the first preferred embodiment, an RF signal of at least about 5 GHz flows in the coplanar line 3, and the dielectric loss characteristics with respect to the RF signal of the movable element 6 made of the high-resistivity semiconductor is equivalent to or superior to the dielectric loss characteristics of a movable element made of an insulator.

As described above, in the first preferred embodiment, since the movable element 6 made of the high-resistivity semiconductor itself functions as an electrode for a DC signal (DC voltage), the movable element 6, and the fixed electrodes 12a and 12b define a movable element displacing unit for displacing the movable element 6. More specifically, applying an external DC voltage (for example, approximately 5 V) between the movable element 6 and the fixed electrodes 12 (12a and 12b) via the electrode pads 14a, 14b, and 14c and the through holes 13a, 13b, and 13c produces electrostatic attraction between the movable element 6 and the fixed electrodes 12. As shown by the arrows B in FIG. 1B, the movable element 6 is attracted towards the fixed electrodes 12 by this electrostatic attraction. Accordingly, the electrostatic attraction produced between the movable element 6 and the fixed electrodes 12 displaces the movable element 6. In other words, in the first preferred embodiment, the movable element 6 and the fixed electrodes 12 define a movable electrode displacing unit for displacing the movable electrodes 10a and 10b towards or away from the coplanar line 3 at the same time.

Also, in the first preferred embodiment, when the external DC voltage is not applied between the movable element 6 and the fixed electrodes 12 (12a and 12b), the insulating films 11 on the movable electrodes 10 are in contact with or are in close proximity to the coplanar line 3. When the insulating films 11 on the movable electrodes 10 are in contact with or in close proximity to the coplanar line 3, the space between the movable electrodes 10 and the coplanar line 3 is very small and the thickness of the space is substantially the same as the thickness of the insulating films 11 (for example, 0.1 μm), thus increasing the capacitance between the movable electrodes 10 and the coplanar line 3.

Figure 11A:
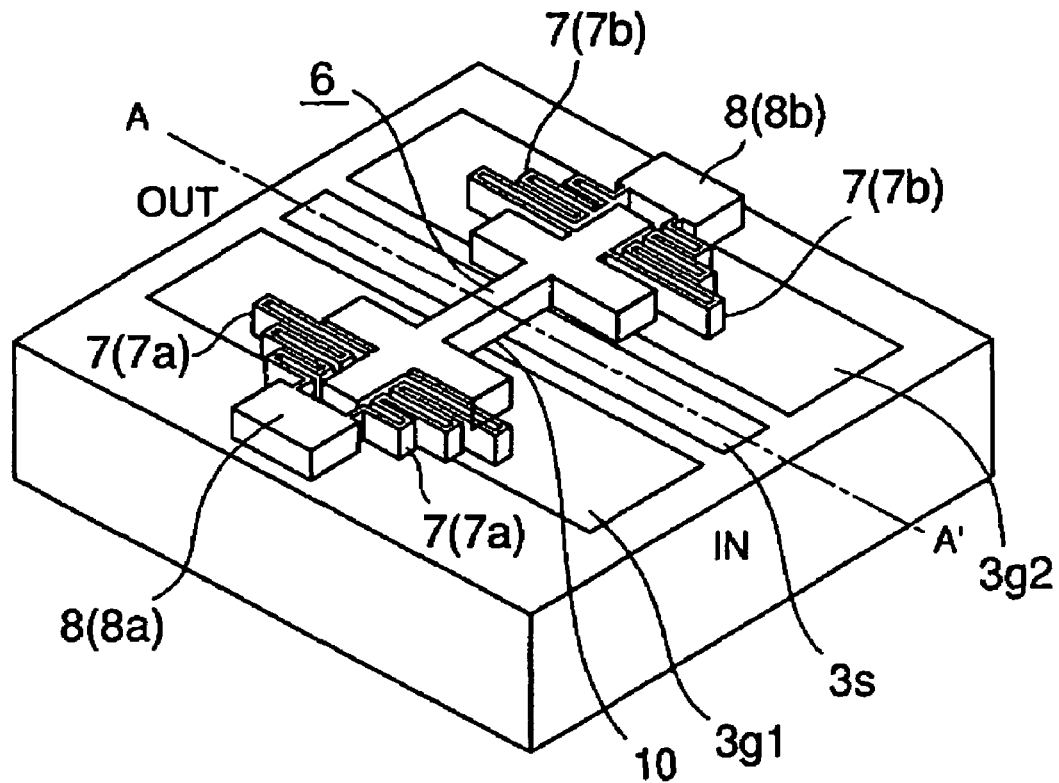
FIGS. 11A and 11B are illustrations for explaining an example of the configuration of a movable element of an RF-MEMS switch provided with only one movable electrode.
Figure 11B:
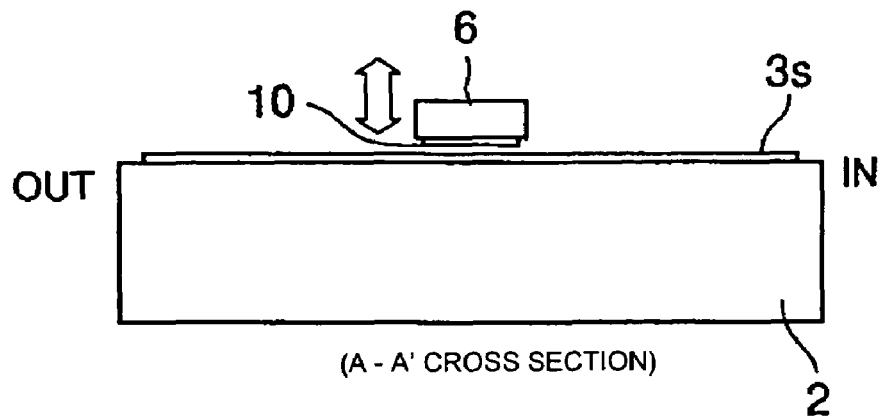

For example, as shown in FIGS. 11A and 11B, a known RF-MEMS switch is provided with only one movable electrode 10. FIG. 11A is a schematic perspective view showing an example of the configuration of the movable element 6 arranged on the substrate 2, together with beams 7 (7a and 7b) and holders 8 (8a and 8b), in the known RF-MEMS switch provided with only one movable electrode 10. FIG. 11B is a cross-sectional view taken along the line A–A' in FIG. 11A.

Figure 12A:
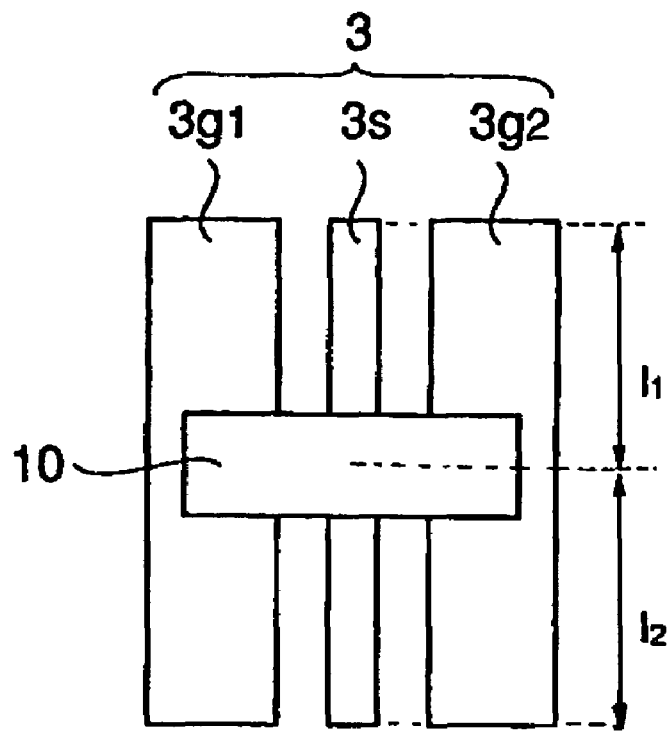
FIGS. 12A and 12B are model diagrams showing an example of the positional relationship between the movable electrode provided on the movable element shown in FIG. 11 and a coplanar line.
Figure 12B:
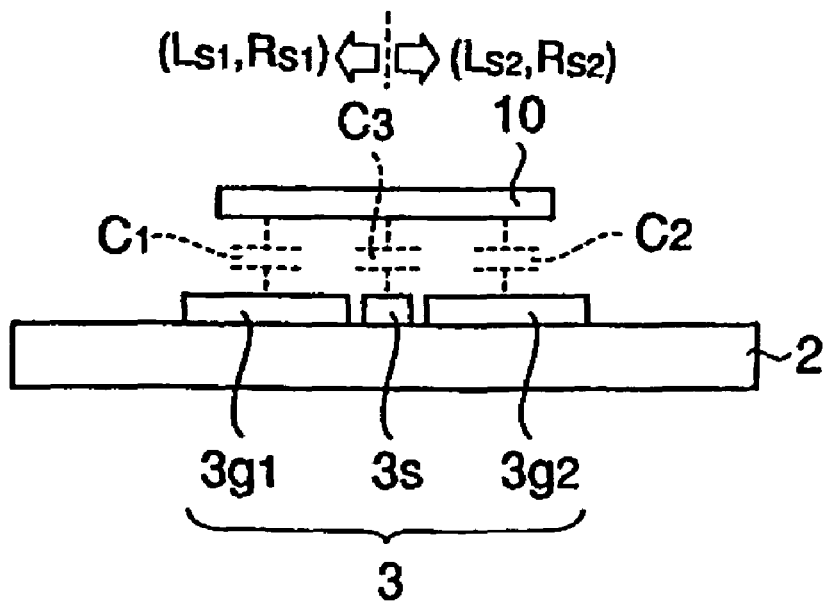
Figure 13A:
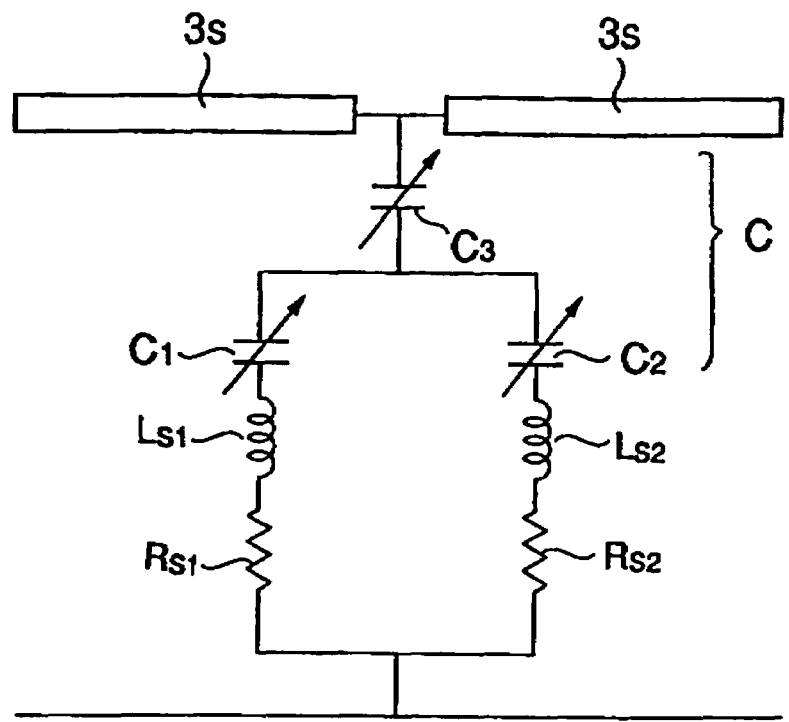
FIGS. 13A and 13B are equivalent circuit diagrams of the movable electrode and the coplanar line of the RF-MEMS switch having the structure shown in FIG. 11A.
Figure 14A:
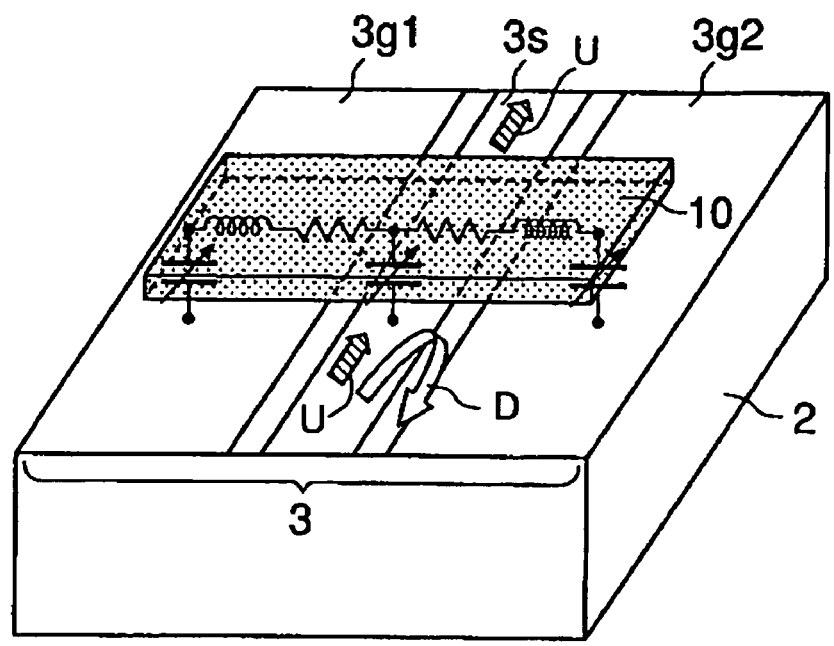
FIGS. 14A and 14B are schematic diagrams for explaining switching on or off of signal conduction of the RF-MEMS switch having the structure shown in FIGS. 11A and 12A.

The positional relationship of the one movable electrode 10 and the coplanar line 3 is shown in a plan view FIG. 12A, a side view FIG. 12B, and a perspective view FIG. 14A. Also, FIG. 13A is an equivalent circuit diagram of the movable electrode 10 and the coplanar line 3 shown in FIGS. 12B. In the drawings, $C_1$ represents the capacitance between the movable electrode 10 and the ground line 3g1, $C_2$ represents the capacitance between the movable electrode 10 and the ground line 3g2, and $C_3$ represents the capacitance between the movable electrode 10 and the signal line 3s. Also, $L_{S1}$ and $R_{S1}$ represent the inductance and resistance of the movable electrode 10 at the ground line 3g1 side, respectively. $L_{S2}$ and $R_{S2}$ represent the inductance and resistance of the movable electrode 10 at the ground line 3g2 side, respectively.

Figure 13B:
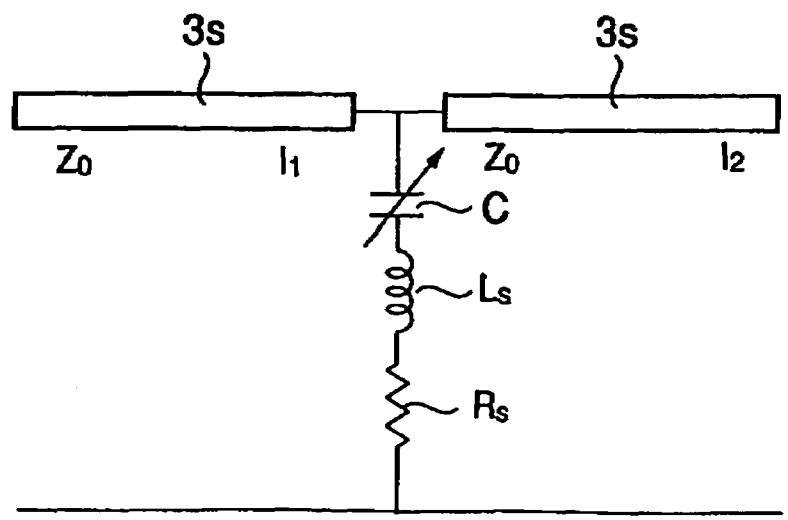
Figure 14B:
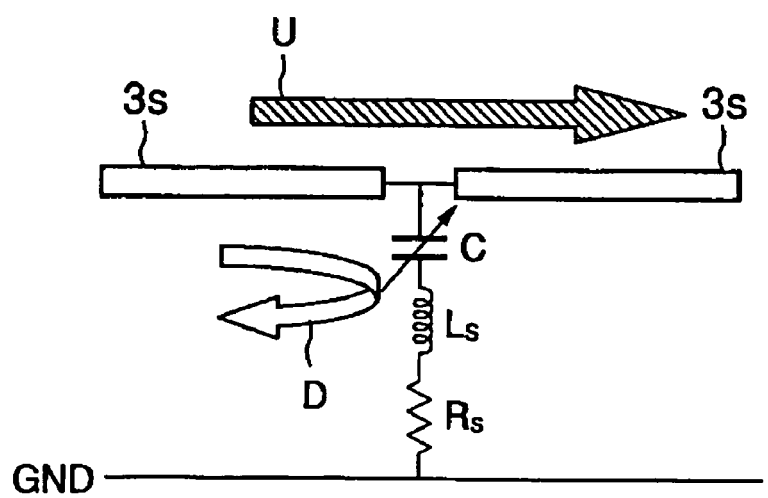

The equivalent circuit shown in FIG. 13A is represented as shown in FIG. 13B (FIG. 14B) by systematic arrangement. The capacitance C is calculated by the equation, $C=1/((1/(C_1+C_2))+(1/C_3))$, the inductance $L_S$ is calculated by the equation, $L_S=1/((1/L_{S1})+(1/L_{S2}))$, and the resistance $R_s$ is calculated by the equation, $R_S=1/((1/R_{S1})+(1/R_{S2}))$.

When attention is paid only to one of the movable electrodes 10 in the RF-MEMS switch 1 according to the first preferred embodiment, an equivalent circuit of the one of the movable electrodes 10 and the coplanar line 3 is represented as described above. However, since the two movable electrodes 10 (10a and 10b) are disposed with a space therebetween in the direction of signal conduction of the coplanar line 3 in the first preferred embodiment, an equivalent circuit of the movable electrodes 10a and 10b and the coplanar line 3 is represented as shown in FIG. 4A.

Figure 4A:
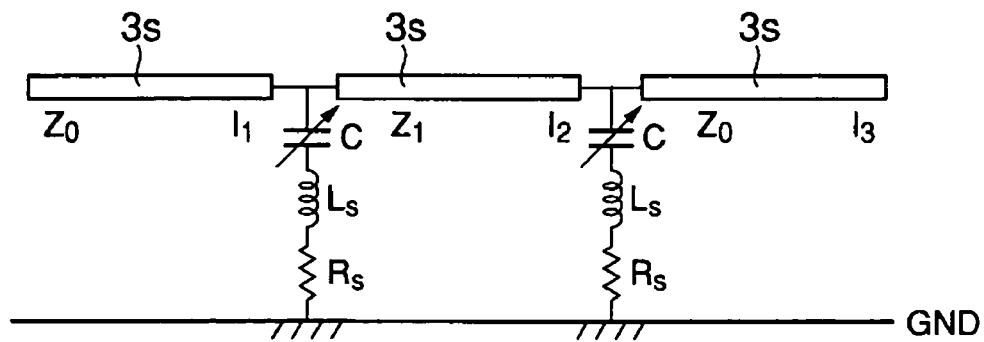
FIGS. 4A, 4B, 4C, and 4D are illustrations of an example of the operation of the RF-MEMS switch according to the first preferred embodiment using equivalent circuit diagrams of the movable electrodes and the coplanar line constituting the RF-MEMS switch according to the first preferred embodiment of the present invention.

The RF-MEMS switch 1 according to the first preferred embodiment is designed such that an increase in the capacitance C between the movable electrodes 10 and the coplanar line 3 due to the decreased space between the movable electrodes 10 and the coplanar line 3 caused by the movable element 6 being lowered towards the substrate 2 causes the series LC resonant frequency f in the equivalent circuit shown in FIG. 4A to approximately equal to the frequency of an RF signal flowing in the signal line 3s (in other words, $f=1/\{2\pi\sqrt{(L_S \cdot C_{DOWN})}\}$, where $C_{DOWN}$ represents the equivalent series capacitance when the movable electrodes 10 are lowered). In general, the known RF-MEMS switch provided with the only one movable electrode 10 shown in FIG. 11A is designed in the same manner in the equivalent circuit shown in FIG. 13B.

Figure 4B:
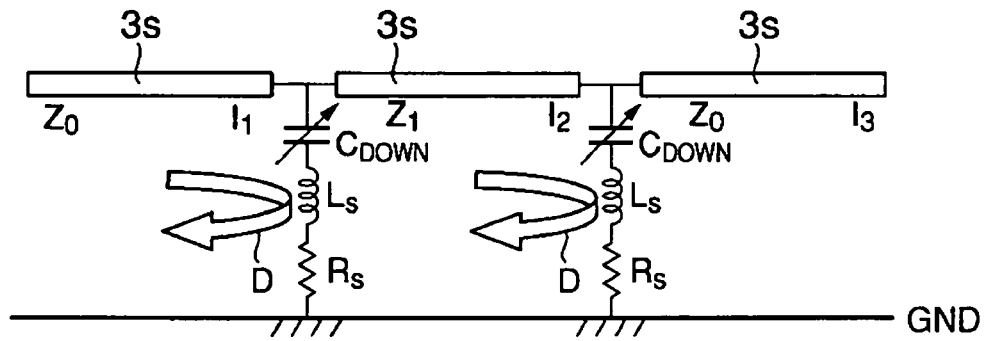

As a result of this, when the movable electrodes 10 are lowered, the impedance of the LC circuit when viewing the ground side from the signal line 3s side through the movable electrodes 10 (the impedance between the signal line 3s of the coplanar line 3 near the movable electrodes 10 and the ground) decreases to a very small value, such as Rs=about 0.1 to about 1 Ω. In other words, a state equivalent to a short circuit occurs when viewing the ground side from the signal line 3s through the movable electrodes 10. Accordingly, a conducting RF signal of the coplanar line 3 is reflected at positions of the coplanar line 3 that face the movable electrodes 10 as shown by the arrows D in the equivalent circuit diagram in FIG. 4B, and conduction of the RF signal of the coplanar line 3 is switched off.

Also, displacing the movable element 6 in a direction away from the substrate 2, that is, displacing the movable element 6 upwards and increasing the space between the movable electrodes 10 and the coplanar line 3, for example, up to approximately 3 μm reduces the capacitance C between the movable electrodes 10 and the coplanar line 3, thereby significantly increasing the impedance when viewing the ground side from the signal line 3s side through the movable electrodes 10. In other words, a state that is equivalent to an open circuit occurs when viewing the ground side from the signal line 3s through the movable electrodes 10. Accordingly, the signal conduction of the coplanar line 3 is switched on, as shown by the arrow U shown in the equivalent circuit diagram in FIG. 4C.

In other words, in the RF-MEMS switch 1 according to the first preferred embodiment, when the movable electrodes 10 are displaced close to the coplanar line 3 so as to be disposed at positions where the signal is switched off, the RF signal in the coplanar line 3 is reflected at positions facing the movable electrodes 10, to switch off the conduction of the RF signal. Also, when the movable electrodes 10 are displaced in the direction away from the coplanar line 3 so as to be disposed at positions where the signal is switched on, the conduction of the RF signal of the coplanar line 3 is switched on.

In the first preferred embodiment, the coplanar line 3 located between the two movable electrodes 10a and 10b defines a transmission line with a length that is less than or equal to approximately a quarter of the wavelength of the conducting RF signal of the coplanar line 3, because the coplanar line 3 located between the movable electrodes 10a and 10b provides a characteristic impedance that is higher than the system impedance. Thus, the coplanar line 3 located between the two movable electrodes 10a and 10b defines a matching circuit.

More specifically, the characteristic impedance and the line length of the coplanar line 3 located between the two movable electrodes 10a and 10b are optimally designed so as to pass the signal most easily, in other words, so as to greatly reduce reflection when the movable electrodes 10 are raised, in accordance with the following equations:

$$Z_1 = Z_0/\sin \theta \quad (1)$$

$$1/(\omega C_{UP}) - \omega L_S = Z_0/\cos \theta \quad (2).$$

Here, $Z_0$ represents the system impedance $\theta$ represents the electrical length of the coplanar line 3 located between the two movable electrodes 10a and 10b, and $\lambda/4$ ($\lambda$ represents the wavelength of a conducting RF signal of the coplanar line 3) is obtained when $\theta$ is about 90 degrees. Also, $\omega$ represents an angular frequency of the conducting RF signal of the coplanar line 3. $C_{UP}$ represents the equivalent series capacitance of each of the movable electrodes 10a and 10b when the movable electrodes 10a and 10b are raised. $L_S$ represents the equivalent series inductance of each of the movable electrodes 10a and 10b.

In other words, in the first preferred embodiment, the length of the coplanar line 3 located between the movable electrodes 10a and 10b is designed such that the electrical length of the coplanar line 3 located between the two movable electrodes 10a and 10b when the movable electrodes 10a and 10b are raised (when the movable electrodes 10a and 10b are disposed at positions where the signal is switched on) is approximately equal to a quarter of the wavelength $\lambda$ of the conducting RF signal of the coplanar line 3 or is within a desired tolerance, in view of the capacitance $C_{UP}$ between the movable electrodes 10a and 10b and the coplanar line 3 when the movable electrodes 10a and 10b are raised. Here, the electrical length of the coplanar line 3 located between the movable electrodes 10a and 10b is different from the physical length thereof. The electrical length is an electrical length for a conducting RF signal of the coplanar line 3 and varies in accordance with a frequency of the conducting RF signal of the coplanar line 3. Also, the capacitance C ($C_{UP}$) between the movable electrodes 10a and 10b and the coplanar line 3 is affected by the electrical length of the coplanar line 3 located between the movable electrodes 10a and 10b. Thus, the electrical length of the coplanar line 3 located between the movable electrodes 10a and 10b is greater than the physical length of the coplanar line 3 located between the movable electrodes 10a and 10b due to the involvement of the C ($C_{UP}$).

In the first preferred embodiment, since the electrical length of the coplanar line 3 located between the movable electrodes 10a and 10b (here, the electrical length for the coplanar line 3 sandwiched between the movable electrodes 10a to 10b) is set, in view of the capacitance C ($C_{UP}$) of the movable electrodes 10a and 10b and the coplanar line 3, to be approximately equal to a quarter of the wavelength of the conducting RF signal of the coplanar line 3 or is within the desired tolerance, reflection of the RF signal is significantly reduced when the movable electrodes 10a and 10b are raised. This is due to the following reason.

Figure 4C:
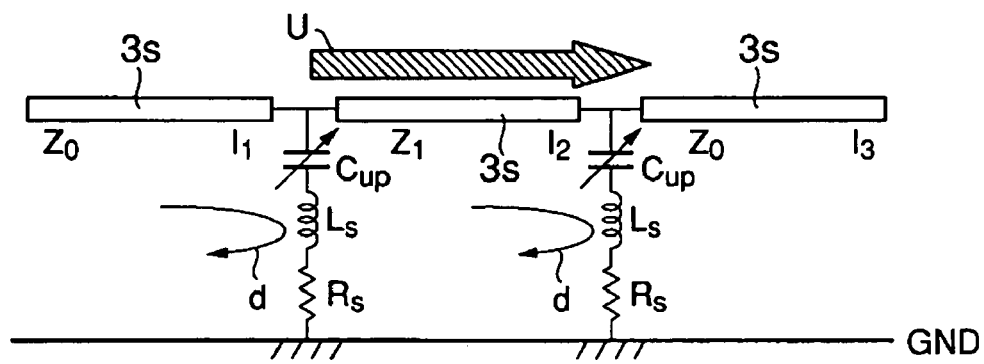

Since very little capacitance $C_{UP}$ is generated between the movable electrodes 10 and the coplanar line 3 when the movable electrodes 10a and 10b are raised (when the conduction of the RF signal of the coplanar line 3 is switched on), a portion of the conducting RF signal of the coplanar line 3 is reflected by the movable electrodes 10a and 10b at positions of the coplanar line 3, as shown by the arrows d in FIG. 4C. In the first preferred embodiment, since the two movable electrodes 10a and 10b are provided, when the RF signal passes in the direction from the movable electrode 10a to the movable electrode 10b, an RF signal (reflected signal Sb) reflected at a position of the coplanar line 3 facing the movable electrode 10b returns towards the movable electrode 10a, so that the RF signal (reflected signal Sb) is combined with an RF signal (reflected signal Sa) reflected at a position of the coplanar line 3 facing the movable electrode 10a.

Figure 4D:
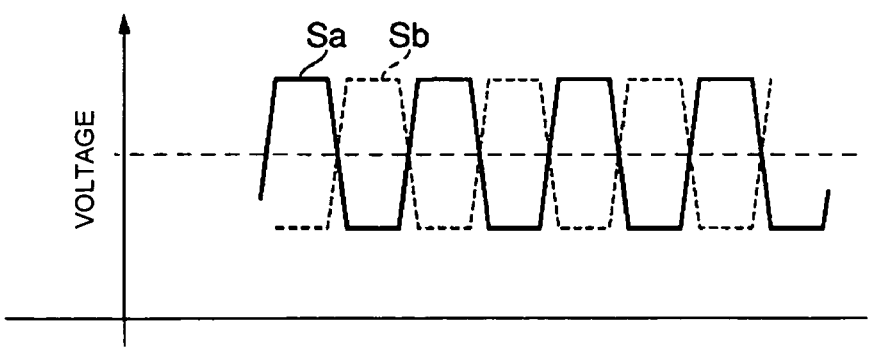

In the first preferred embodiment, since the electrical length of the coplanar line 3 located between the movable electrodes 10a and 10b is approximately equal to a quarter of the wavelength of the RF signal, the reflected signal Sb leads the reflected signal Sa by approximately $\lambda/2$ in the process of combination of the reflected signal Sb and the reflected signal Sa. In other words, when the reflected signal Sa has a wave shape shown by the solid line Sa in FIG. 4D, the reflected signal Sb, which is combined with the reflected signal Sa, has a wave shape shown by the solid line Sb in FIG. 4D. The reflected signal Sb has a phase that is approximately opposite to the reflected signal Sa. Thus, the reflected signals Sa and Sb cancel each other out when combined with each other, such that the amplitude of the combined signal is approximately zero.

Accordingly, since the RF-MEMS switch 1 according to the first preferred embodiment is provided with the two movable electrodes 10a and 10b, and the electrical length of the coplanar line 3 located between the movable electrodes 10a and 10b is approximately equal to a quarter of the wavelength of the RF signal in the first preferred embodiment, the amplitude of the combined reflected signal when the conduction of the RF signal of the coplanar line 3 is switched on is greatly reduced due to the combination of the reflected signals Sa and Sb, as compared with the known RF-MEMS switch including only one movable electrode 10 and in which only one reflected signal is generated as shown by the arrow D in FIG. 14A.

A specific example of the optimal design will now be described with reference to FIG. 3A. Here, $Z_0=50\Omega$ (for example, the line width W5 of the signal line 3s is about 50 µm and the width W4 of the space (gap) between the signal line 3s and the ground line 3g1 and the width W6 of the space (gap) between the signal line 3s and the ground line 3g2 are about 31 µm), $\theta=53°$ (for example, the length $l_2$ of the signal line 3s located between the movable electrodes 10a and 10b is about 232 µm and the frequency of an RF signal is about 76.5 GHz), $Z_1=63\Omega$ (for example, the line width W2 of the signal line 3s located between the movable electrodes 10a and 10b is about 30 µm and the width W1 of the space between the signal line 3s and the ground line 3g1 and the width W3 of the space between the signal line 3s and the ground line 3g2 are about 41 µm), $l_1=844$ µm, $l_3=924$ µm, $R_S=0.25$ Ω, $C_{UP}=20$fF, and $L_S=43.28$ pH. In this case, the relationship between the frequency of the RF signal and the insertion loss is represented by the characteristic line a in FIG. 5 and the relationship between the frequency of the RF signal and the return loss is represented by the characteristic line a in FIG. 6. Here, FIG. 3A is a schematic diagram, and the lengths of $l_1$, $l_2$, and $l_3$ in FIG. 3A do not correspond to the values mentioned above.

Figure 5:
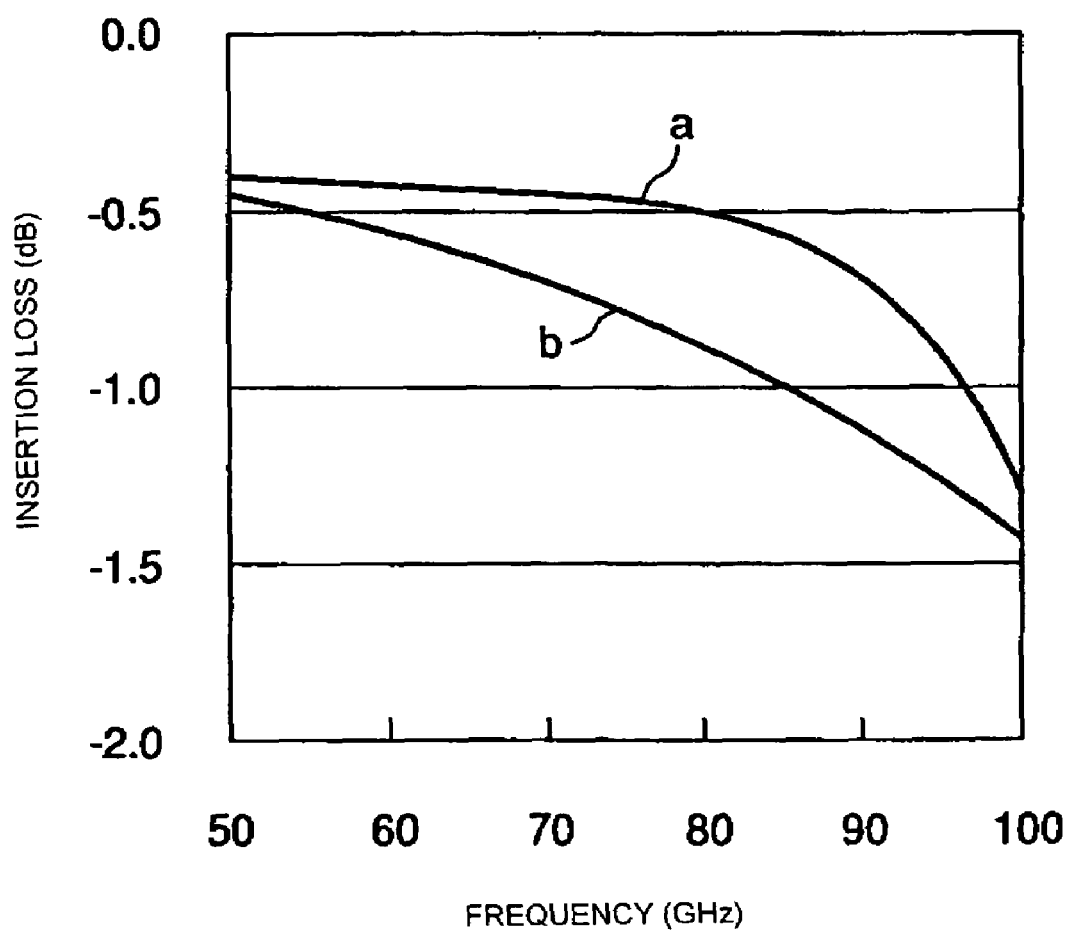
FIG. 5 is a graph showing an example of the frequency characteristics of insertion loss when a signal passes for explaining an advantage obtained by the structure according to the first preferred embodiment of the present invention.
Figure 6:
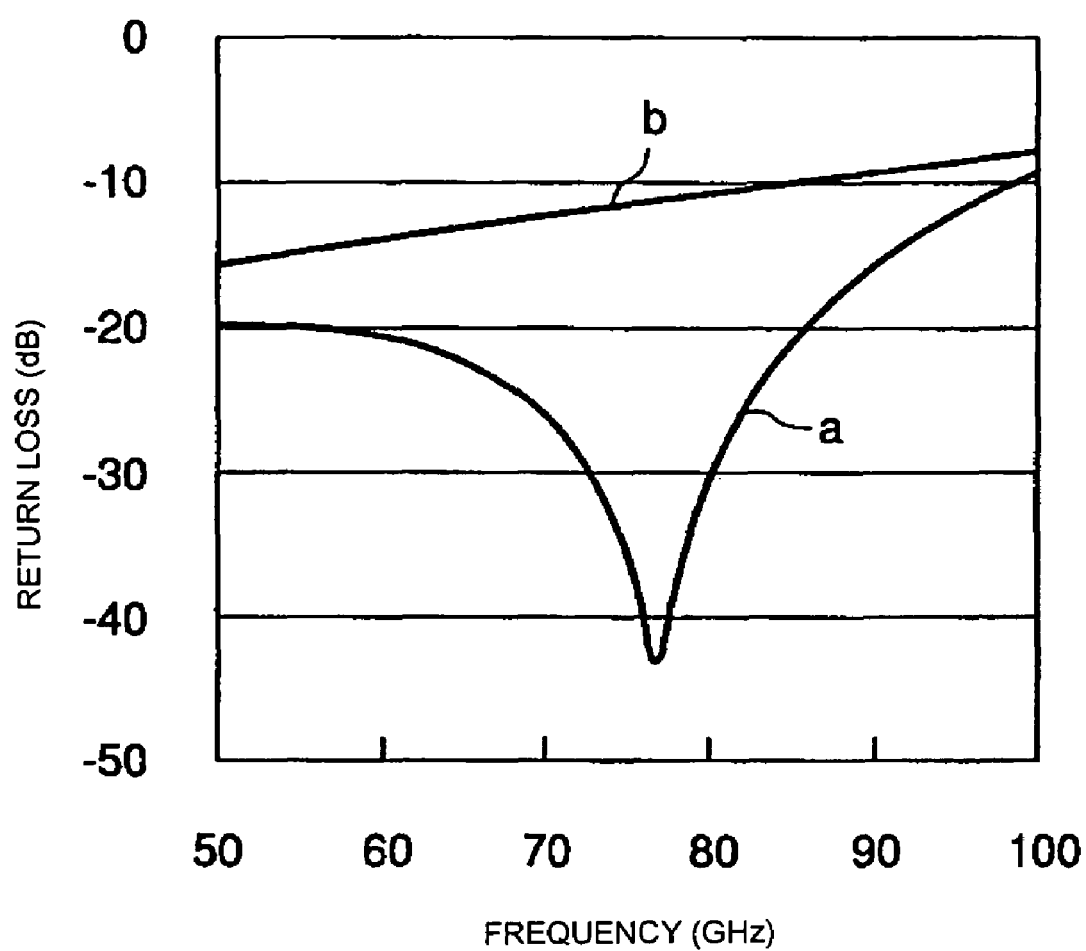
FIG. 6 is a graph showing an example of the frequency characteristics of return loss when the signal passes for explaining an advantage obtained by the structure according to the first preferred embodiment of the present invention.

The characteristic lines b in FIGS. 5 and 6 represent the frequency characteristics of the insertion loss and the frequency characteristics of the return loss, respectively, of the known RF-MEMS switch shown in FIG. 11 that is provided with only one movable electrode 10. The characteristic lines b are obtained under the conditions that $Z_0=50$ Ω, and $Rs=0.25$ Ω, $C_{UP}=20$ fF, and $L_S=43.28$ pH, as described above, and the lengths $l_1$ and $l_2$ shown in FIG. 11A are set as: $l_1=1{,}000$ µm and $l_2=1{,}000$ µm.

As shown in FIGS. 5 and 6, in the RF-MEMS switch 1 according to the first preferred embodiment, displacing the plurality of movable electrodes 10 (10a and 10b) at the same time greatly suppresses the return loss of the wavelength of the RF signal input to the coplanar line 3 centered on 76.5 GHz and also greatly reduces the insertion loss, as compared with the known RF-MEMS switch provided with only one movable electrode 10.

Figure 7:
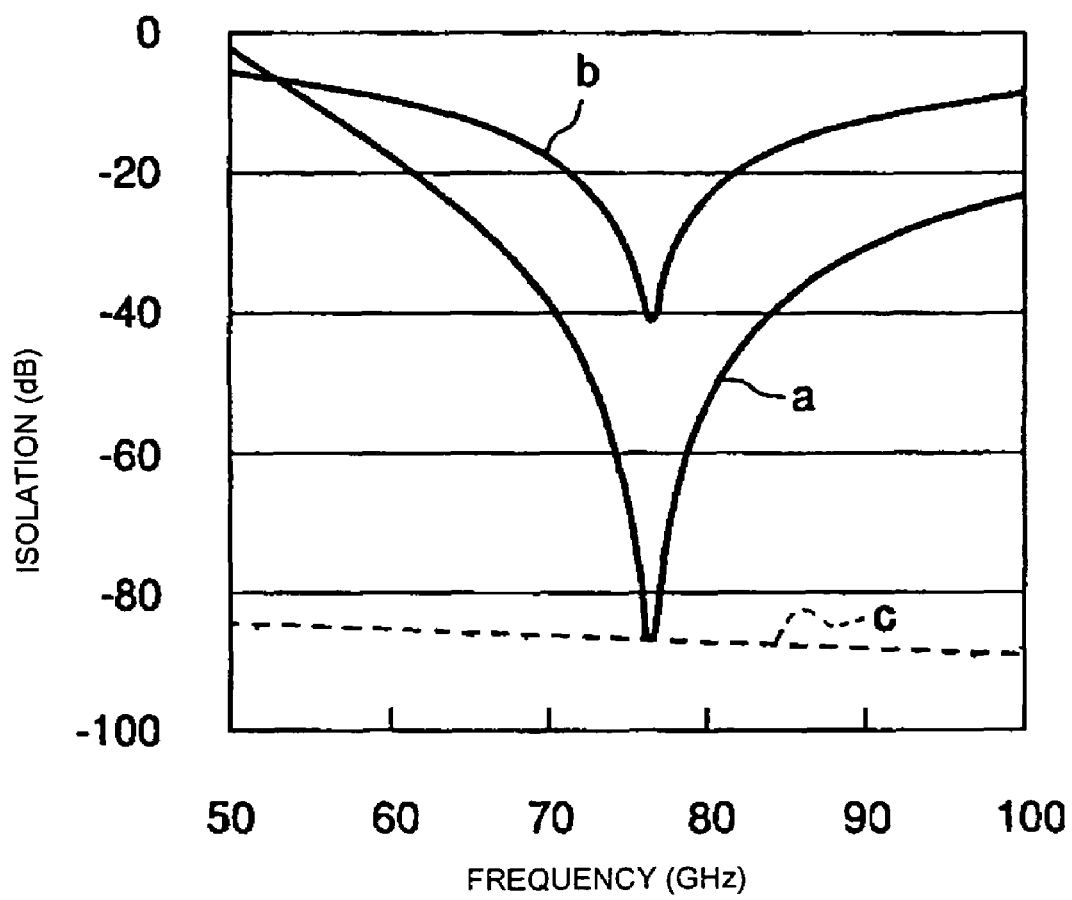
FIG. 7 is a graph showing an example of the frequency characteristics of isolation when the signal is blocked for explaining an advantage obtained by the structure according to the first preferred embodiment of the present invention.

Moreover, in the first preferred embodiment, the signal is blocked when the movable electrodes 10a and 10b are lowered. The characteristic line a in FIG. 7 represents the isolation characteristics. In contrast, the characteristic line b in FIG. 7 represents the isolation characteristics of the known RF-MEMS switch provided with only one movable electrode 10. As shown by the characteristic lines a and b, the RF-MEMS switch 1 according to the first preferred embodiment greatly improves the isolation characteristics as compared to the known RF-MEMS switch provided with only one movable electrode 10. Here, the characteristic lines a and b shown in FIG. 7 represent isolations obtained under the same conditions for the characteristic lines a and b shown in FIGS. 5 and 6, respectively, with the exception of $C_{DOWN}=100$fF.

As described above, the RF-MEMS switch 1 according to the first preferred embodiment greatly reduces the insertion loss and return loss of the switch and greatly improving the isolation characteristics of the switch.

Also, in the first preferred embodiment, the structure of the beams 7 and the holders 8 supporting the movable element 6 that is provided with the two movable electrodes 10 may be formed in a similar manner to those of the known RF-MEMS switch that is provided with the one movable electrode 10. Also, switching on or off is performed by operating the movable electrodes 10a and 10b at the same time with a greatly reduced power consumption.

Furthermore, in the first preferred embodiment, the movable element 6 preferably includes a high-resistivity semiconductor. Thus, the movable element 6 itself defines an electrode of the movable element displacing unit, as described above. Thus, there is no need to provide an electrode on the movable element 6 to define the movable element displacing unit, thereby simplifying the structure and the manufacturing process of the RF-MEMS switch 1. Consequently, the cost of the RF-MEMS switch 1 is greatly reduced.

The movable element 6 including the high-resistivity semiconductor also defines an insulator for an RF signal, and the dielectric loss (tan δ) of the movable element 6 is less than or equal to that of the insulator, which reduces the propagation loss of the RF signal. In recent years, the frequency of signals has increased. Increased dielectric loss of the movable element composed of the insulator in the higher frequency range (refer to the solid line B in FIG. 8) disadvantageously increases the propagation loss of the signal by the movable element. In contrast, since the movable element 6 according to the first preferred embodiment includes the high-resistivity semiconductor, the dielectric loss of the movable element 6 is reduced as the frequency of the signal increases (refer to the solid line A in FIG. 8). Thus, the propagation loss of the signal by the movable element 6 is reduced by increasing the frequency of the signal. Accordingly, the arrangement according to the first preferred embodiment will become even more useful in the future.

If the coplanar line 3 and the movable electrodes 10 (10a and 10b) were directly coupled to each other, although a switch exhibiting broadband isolation characteristics irrespective of the frequency of an RF signal could be provided, the resistance $R_S$ would be increased by a contact resistance component added to the resistance $R_S$ and the signal loss would thus be increased. In contrast, in the first preferred embodiment, since the coplanar line 3 and the movable electrodes 10 (10a and 10b) are coupled to each other with the capacitance therebetween, contact resistance is eliminated between the coplanar line 3 and the movable electrodes 10 (10a and 10b), which thereby greatly suppresses the signal loss.

A second preferred embodiment of the present invention will now be described. In the description of the second preferred embodiment, the same elements as in the first preferred embodiment are referred to with the same reference numerals and the descriptions of those same elements will be omitted here.

In the second preferred embodiment, the through hole 13c and the electrode pad 14c shown in FIG. 1 for conductively connecting the movable element 6 to the outside thereof are omitted. With this structure, the movable element 6 is electrically floating. The structure according to the second preferred embodiment is similar to that in the first preferred embodiment with this exception. Thus, advantages that are similar to those in the first preferred embodiment are achieved. Also, the structure according to the second preferred embodiment in which the through hole 13c and the electrode pad 14c are omitted is simpler than the structure according to the first preferred embodiment, and thus, the manufacturing cost are reduced.

A third preferred embodiment of the present invention will now be described. In the description of the third preferred embodiment, the same elements as those in the first and second preferred embodiments are referred to with the same reference numerals and the descriptions of those same elements will be omitted here.

Figure 9:
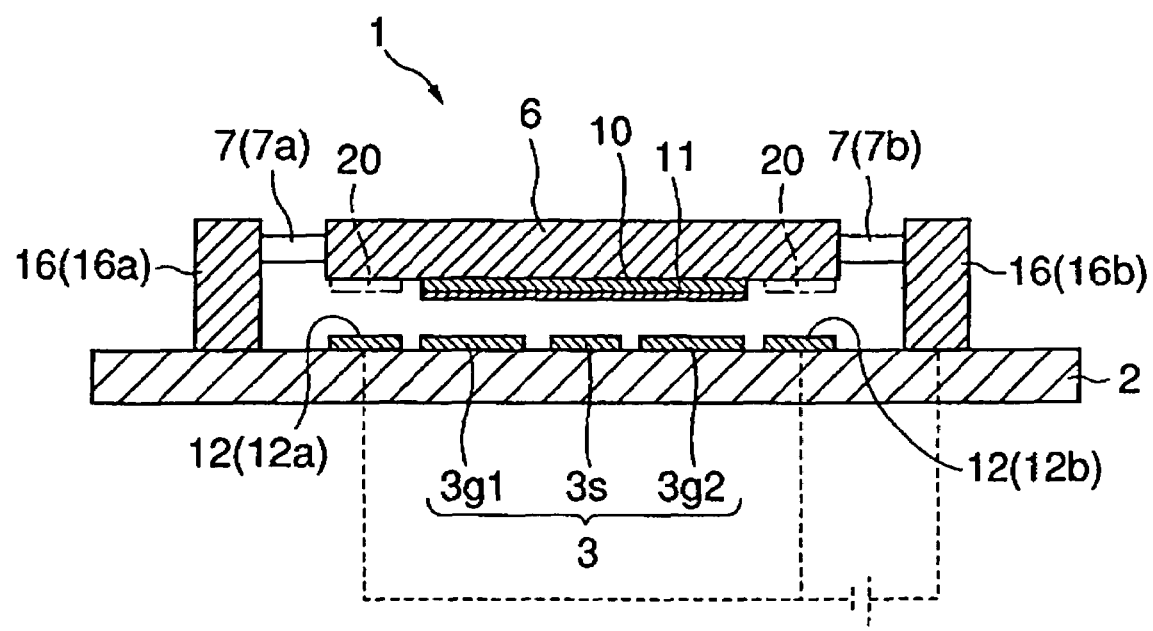
FIG. 9 is an illustration for explaining an RF-MEMS switch according to a third preferred embodiment of the present invention.

In the third preferred embodiment, as shown in FIG. 9, the fixed electrodes 12 (12a and 12b) are arranged below the movable element 6. In other words, the fixed electrodes 12 are arranged on the substrate 2 so as to face a portion of the movable element 6. Although the upper member 4 shown in FIG. 1B is provided in the first and second preferred embodiments in order to dispose the fixed electrodes 12 above the movable element 6, the upper member 4 is omitted in the third preferred embodiment because the fixed electrodes 12 are arranged on the substrate 2. Also, in the third preferred embodiment, the movable element 6 is fixed above the substrate 2 via fixing units 16 (16a and 16b), instead of the upper member 4, with the beams 7 (7a and 7b) provided therebetween.

In the third preferred embodiment, since the fixed electrodes 12 are arranged on the substrate 2, a DC voltage applied between the movable element 6 and the fixed electrodes 12 causes the movable element 6 to be attracted towards the substrate 2. Thus, when no DC voltage is applied between the movable element 6 and the fixed electrodes 12, a space is provided between the insulating films 11 on the movable electrodes 10 and the coplanar line 3 and the movable electrodes 10 are raised, as shown in FIG. 9. This reduces the capacitance between the movable electrodes 10 and the coplanar line 3, and the conduction of the RF signal of the coplanar line 3 is thus switched on. When a DC voltage is applied between the movable element 6 and the fixed electrodes 12, the movable element 6 is attracted towards the substrate 2 and the movable electrodes 10 are lowered. This increases the capacitance between the movable electrodes 10 and the coplanar line 3, and the conduction of the RF signal of the coplanar line 3 is thus switched off.

In the third preferred embodiment, the upper member 4 shown FIG. 1B is omitted, thus the structure and manufacturing process of the third preferred embodiment is simplified.

Although the upper member 4 is omitted in the third preferred embodiment, even if the fixed electrodes 12 are arranged on the substrate 2 as in the third preferred embodiment, the upper member 4 and the fixing units 5 may be provided as in the first and second preferred embodiments to protect the movable element 6 and hermetically seal the area in which the movable element 6 is arranged.

The present invention is not limited to the first to third preferred embodiments, and other embodiments are possible. For example, although the fixing units 5 for fixing the upper member 4 above the substrate 2 are provided on two sides of the substrate 2 in the first and second preferred embodiments, the arrangement of the fixing units 5 is not particularly limited. For example, the fixing units 5 may be provided along the four sides of the substrate 2 such that the area in which the movable element 6 is arranged is surrounded by the fixing units 5. It is desirable that the fixing units 5 with such an arrangement and the upper member 4 be provided so as to hermetically seal the area in which the movable element 6 is arranged.

Although the coplanar line is provided as the RF signal-conducting unit in the first to third preferred embodiments, a microstrip line, for example, may be provided as the RF signal-conducting unit.

Although high-resistivity silicon is used for the high-resistivity semiconductor defining the movable element 6 in each of the preferred embodiments described above, the movable element 6 may be made of a high-resistivity semiconductor made of, for example, gallium arsenide (GaAs) or other suitable material.

Furthermore, the movable element 6 may be made of a semiconductor exhibiting insulation performance for RF signals or an insulator. In this case, for example, movable electrodes 20 are arranged at positions facing the fixed electrodes 12, as shown by the dot-dash lines in FIG. 9. The movable electrodes 20 and the fixed electrodes 12 function as a movable element displacing unit for displacing the movable element 6 towards the fixed electrodes 12 by electrostatic attraction caused by a DC voltage applied between the fixed electrodes 12 and the movable electrodes 20. Also, the movable element displacing unit and the movable element 6 function as a movable electrode displacing unit for displacing all of the movable electrodes 10a and 10b at the same time in the same direction towards or away from the coplanar line 3.

Furthermore, although the insulating films 11 are provided on the movable electrodes 10 in the first to third preferred embodiments, the insulating films 11 may be provided on portions of the coplanar line 3 that face the movable electrodes 10. Alternatively, the insulating films 11 may be provided on the surfaces of the movable electrodes 10 and the surface of the coplanar line 3 that face each other.

Furthermore, although the movable element 6 is provided with the two movable electrodes 10 in the first to third preferred embodiments, the movable element 6 may be provided with three or more movable electrodes 10. Alternatively, a plurality of movable electrodes 10 may be provided with spaces therebetween in the direction of signal conduction of the RF signal-conducting unit by providing a plurality of movable elements 6 each provided with one movable electrode 10. Furthermore, a plurality of movable electrodes 10 may be provided with spaces therebetween in the direction of signal conduction of the RF signal-conducting unit by providing a plurality of movable elements 6 each provided with a plurality of movable electrodes 10. When three or more movable electrodes 10 are arranged, the electrical length for the RF signal-conducting unit sandwiched between the movable electrodes 10 is determined in such a manner that the amplitude of a combined signal of RF signals reflected in positions of the RF signal-conducting unit facing the movable electrodes 10 is smaller than the amplitude of each of the signals reflected in positions of the RF signal-conducting unit facing the movable electrodes 10.

Also, although a shunt switch is used in the first to third preferred embodiments, conduction of an RF signal of the RF signal-conducting unit may be switched on or off by separation or direct contact of at least portion of the RF signal-conducting unit of the coplanar line 3 and the movable electrode 10 that face each other. In this case, the equivalent circuit of an RF-MEMS switch provided with the two movable electrodes 10a and 10b is represented by FIGS. 10A and 10B.

Figure 10A:
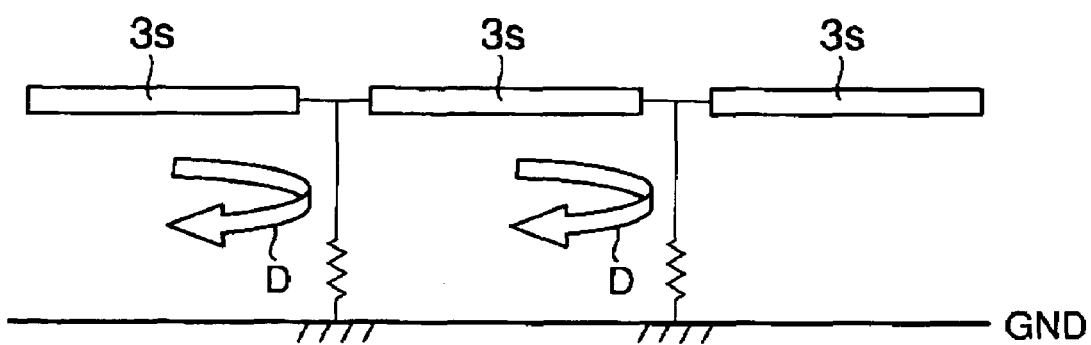
FIGS. 10A and 10B are equivalent circuit diagrams for explaining an example of the operation of a switch of a type in which conduction of an RF signal of the RF signal-conducting unit is switched on or off by separation or direct contact of the movable electrodes and the RF signal-conducting unit.

In other words, the equivalent circuit shown in FIG. 10A represents a state in which the movable electrodes 10a and 10b directly contact the coplanar line 3 (the movable electrodes 10a and 10b are disposed in positions where the signal is switched off). In this case, the signal line 3s of the coplanar line 3 is directly short-circuited to ground via the movable electrodes 10a and 10b. Thus, the RF signal is reflected at positions of the coplanar line 3 that are in contact with the movable electrodes 10a and 10b, as shown by the arrows D in FIG. 10A, and the conduction of the RF signal of the coplanar line 3 is switched off.

Figure 10B:
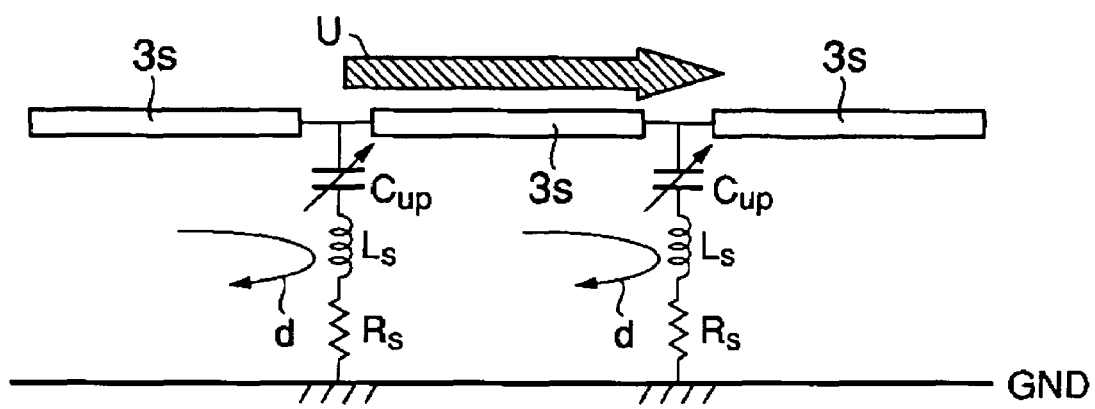

The equivalent circuit shown in FIG. 10B represents a state in which the movable electrodes 10a and 10b are spaced from the coplanar line 3 so as to be disposed at positions where the signal is switched on. In this case, the capacitance $C_{UP}$ between the movable electrodes 10a and 10b and the coplanar line 3 is reduced, and a state equivalent to an open circuit occurs when viewing the ground from the signal line 3s through the movable electrodes 10 (capacitance $C_{UP}$). Thus, the conduction of the RF signal of the coplanar line 3 is switched on. As described above, when the movable electrodes 10a and 10b are raised, switches of this type in which the movable electrodes 10a and 10b directly contact the coplanar line 3 and the shunt switches according to the first to third preferred embodiments are in the same state.

Where the movable electrodes 10a and 10b directly contact the coplanar line 3, the space between the movable electrodes 10a and 10b, the space between the movable electrodes 10a and 10b and the coplanar line 3 when the movable electrodes 10a and 10b are disposed in positions where the signal is switched on, and the length of the coplanar line 3 located between the movable electrodes 10a and 10b are determined such that the electrical length for the coplanar line 3 sandwiched between the movable electrodes 10a and 10b is approximately equal to a quarter of the wavelength λ of the conducting RF signal of the coplanar line 3 when the movable electrodes 10a and 10b are disposed at positions where the signal is switched on, as in the first to third preferred embodiments. Thus, even a switch of a type in which the movable electrodes 10 (10a and 10b) directly contact the coplanar line 3 reduces the insertion loss and the return loss, as in the first to third preferred embodiments. Here, for a switch of this type in which the movable electrodes 10 directly contact the coplanar line 3, the frequency characteristics have approximately constant isolation irrespective of the frequency of the conducting RF signal of the coplanar line 3, as shown by the characteristic line c represented by the dotted line in FIG. 7. A switch of this type in which the movable electrodes 10 directly contact the coplanar line 3 improves the isolation by providing a plurality of movable electrodes 10.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. An RF-MEMS switch comprising:
   a substrate;
   a movable element;
   an RF signal-conducting unit arranged on the substrate;
   a plurality of movable electrodes disposed on the movable element, having a space provided therebetween in a direction of signal conduction of the RF signal-conducting unit and arranged above the RF signal-conducting unit;
   a movable electrode displacing unit for displacing the plurality of movable electrodes at the same time in the same direction towards or away from the RF signal-conducting unit;
   an upper member disposed above the movable element; and
   at least one fixed electrode disposed on the upper member; wherein
   when all of the plurality of movable electrodes are displaced in the direction away from the RF signal-conducting unit by the movable electrode displacing unit so as to be disposed at positions where a signal is switched on, conduction of an RF signal of the RF signal-conducting unit is switched on;
   when all the plurality of movable electrodes are displaced in the direction towards the RF signal-conducting unit by the movable electrode displacing unit so as to be disposed at positions where the signal is switched off, conduction of the RF signal of the RF signal-conducting unit is switched off; and
   an electrical length of the RF signal-conducting unit sandwiched between the plurality of movable electrodes is set such that an amplitude of a combined signal composed of RF signals reflected at positions of the RF signal-conducting unit facing the plurality of movable electrodes is less than an amplitude of each of signals reflected at positions of the RF signal-conducting unit facing the plurality of movable electrodes when the plurality of movable electrodes are disposed at positions where the signal is switched on.

2. An RF-MEMS switch according to claim 1, wherein the plurality of movable electrodes include a pair of movable electrodes, and when the pair of movable electrodes is disposed at positions where the signal is switched on by the movable electrode displacing unit, the electrical length for the RF signal-conducting unit sandwiched between the pair of movable electrodes is approximately equal to a quarter of the wavelength of the conducting RF signal of the RF signal-conducting unit.

3. An RF-MEMS switch according to claim 1, further comprising a protective insulating film provided on at least one of the surfaces of the RF signal-conducting unit and the movable electrodes, the surface of the RF signal-conducting unit being opposite to the surfaces of the movable electrodes.

4. An RF-MEMS switch according to claim 1, wherein the RF signal-conducting unit includes one of a coplanar line and a microstrip line, and the RF-MEMS switch is a shunt switching device for switching on or off the conduction of the signal of the coplanar line or the microstrip line functioning as the RF signal-conducting unit by utilizing a change in the capacitance between the movable electrodes and the RF signal-conducting unit.

5. An RF-MEMS switch according to claim 1, wherein the RF-MEMS switch is a switching device for switching on or off the conduction of the signal of the RF signal-conducting unit by one of separation and direct contact of at least a portion of the movable electrodes and the RF signal-conducting unit that face each other.

6. An RF-MEMS switch comprising:
   a substrate;
   an RF signal-conducting unit arranged on the substrate;
   a movable element disposed above the substrate with a space provided therebetween and facing at least a portion of the RF signal-conducting unit;
   a plurality of movable electrodes arranged on the movable element and facing the RF signal-conducting unit;
   a movable element displacing unit for displacing the movable element in a direction towards or away from the substrate via electrostatic attraction;
   an upper member disposed above the movable element; and
   at least one fixed electrode disposed on the upper member; wherein
   the plurality of movable electrodes is disposed with a space provided therebetween in the direction of signal conduction of the RF signal-conducting unit; and
   the RF signal-conducting unit located between the plurality of movable electrodes defines a transmission line having a length that is less than or equal to a quarter of a wavelength of the conducting RF signal of the RF signal-conducting unit such that the RF signal-conducting unit located between the plurality of movable electrodes provides a characteristic impedance that is greater than a system impedance.

7. An RF-MEMS switch according to claim 6, wherein the upper member faces a top portion of the movable element with a space provided therebetween and said at least one fixed electrode is arranged on the upper member to face at least a portion of the movable element, wherein the movable element includes a high-resistivity semiconductor defining an insulator for an RF signal and an electrode for a low-frequency signal and a DC signal, and the at least one fixed electrode and the movable element define the movable element displacing unit for displacing the movable element towards the at least one fixed electrode using electrostatic attraction caused by a DC voltage applied between the at least one fixed electrode and the movable element.

8. An RF-MEMS switch according to claim 6, wherein the RF signal-conducting unit includes one of a coplanar line and a microstrip line, and the RF-MEMS switch is a shunt switching device for switching on or off the conduction of the signal of the coplanar line or the microstrip line functioning as the RF signal-conducting unit by utilizing a change in the capacitance between the movable electrodes and the RF signal-conducting unit.

9. An RF-MEMS switch according to claim 6, wherein the RF-MEMS switch is a switching device for switching on or off the conduction of the signal of the RF signal-conducting unit by one of separation and direct contact of at least a portion of the movable electrodes and the RF signal-conducting unit that face each other.

10. An RF-MEMS switch comprising:
a substrate;
an RF signal-conducting unit arranged on the substrate;
a plurality of movable elements disposed with a space provided therebetween in the direction of signal conduction of the RF signal-conducting unit, arranged above the substrate with a space provided therebetween, and facing at least a portion of the RF signal-conducting unit;
movable electrodes arranged on the corresponding movable elements and facing the RF signal-conducting unit;
a movable element displacing unit for displacing the movable elements in the direction towards or away from the substrate using electrostatic attraction;
an upper member disposed above the movable element; and
at least one fixed electrode disposed on the upper member; wherein
the RF signal-conducting unit located between the plurality of movable electrodes defines a transmission line having a length that is less than or equal to a quarter of the wavelength of the conducting RF signal of the RF signal-conducting unit such that the RF signal-conducting unit located between the plurality of movable electrodes provides a characteristic impedance is greater than a system impedance.

11. An RF-MEMS switch according to claim 10, wherein the movable element includes a plurality of movable electrodes, and the plurality of movable electrodes are disposed with a space provided therebetween in the direction of the signal conduction of the RF signal-conducting unit.

12. An RF-MEMS switch according to claim 10, wherein the upper member faces a top portion of the movable element with a space provided therebetween and at least one fixed electrode is arranged on the upper member to face at least a portion of the movable element, wherein the movable element includes a high-resistivity semiconductor defining an insulator for an RF signal and an electrode for a low-frequency signal and a DC signal, and the at least one fixed electrode and the movable element define the movable element displacing unit for displacing the movable element towards the at least one fixed electrode using electrostatic attraction caused by a DC voltage applied between the at least one fixed electrode and the movable element.

13. An RF-MEMS switch according to claim 10, further comprising a protective insulating film provided on at least one of the surfaces of the RF signal-conducting unit and the movable electrodes, the surface of the RF signal-conducting unit being opposite to the surfaces of the movable electrodes.

14. An RF-MEMS switch according to claim 10, wherein the RF signal-conducting unit includes one of a coplanar line and a microstrip line, and the RF-MEMS switch is a shunt switching device for switching on or off the conduction of the signal of the coplanar line or the microstrip line functioning as the RF signal-conducting unit by utilizing a change in the capacitance between the movable electrodes and the RF signal-conducting unit.

15. An RF-MEMS switch according to claim 10, wherein the RF-MEMS switch is a switching device for switching on or off the conduction of the signal of the RF signal-conducting unit by one of separation and direct contact of at least a portion of the movable electrodes and the RF signal-conducting unit that face each other.

* * * * *